(12) United States Patent
Suzuki (10) Patent No.: US 6,771,579 B2
(45) Date of Patent: Aug. 3, 2004

(54) OPTICAL RECORDING METHOD AND OPTICAL RECORDING MEDIUM

(75) Inventor: Yuki Suzuki, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 544 days.

(21) Appl. No.: 09/942,566

(22) Filed: Aug. 31, 2001

(65) Prior Publication Data

US 2002/0051416 A1 May 2, 2002

(30) Foreign Application Priority Data

Sep. 1, 2000 (JP) ........................................ 2000-265158

(51) Int. Cl.[7] ................................................. G11B 5/76
(52) U.S. Cl. ................................. 369/59.12; 369/275.3
(58) Field of Search ............................. 369/47.5, 47.51, 369/53.26, 53.34, 59.11, 59.12, 59.24, 124.04, 275.3, 288

(56) References Cited

U.S. PATENT DOCUMENTS

| 6,028,836 A | 2/2000 | Kosuda et al. |
| 6,214,519 B1 | 4/2001 | Suzuki et al. |
| 6,225,023 B1 | 5/2001 | Okamoto et al. |
| 6,226,255 B1 | 5/2001 | Suzuki et al. |
| 6,232,036 B1 | 5/2001 | Suzuki et al. |
| 6,284,877 B1 | 9/2001 | Okamoto et al. |

FOREIGN PATENT DOCUMENTS

| JP | 10-214423 | 8/1998 |
| JP | 11-195242 | 7/1999 |

OTHER PUBLICATIONS

Yuki Suzuki, et al., Jpn. J. Appl. Phys. vol. 40, No. 3B, pp. 1588–1589, "The 4.7 GB Recordable Digital Versatile Disc (DVD–R) for Multiple Speed Recording", Mar. 2001.
S. Taniguchi, et al., Technical Reprot of IEICE, pp. 27–33, "DVD–R System", Mar. 1997 (with English translation).

*Primary Examiner*—Paul W. Huber
(74) *Attorney, Agent, or Firm*—Oblon, Spivak, McClelland, Maier & Neustadt, P.C.

(57) ABSTRACT

An optical recording method for an optical recording medium having a recording layer containing an organic colorant on a transparent substrate, which comprises applying a recording laser beam divided into n−2 (wherein n is an integer of at least 2) pulses (or into 1 pulse when n is 2), to the optical recording medium, to form a mark having a recording data of nT (wherein T is the reference clock period), wherein the length of the forefront pulse is at least 1.7T and at most 2.4T, and the lengths of the second and subsequent pulses (multi-pulses) are at least 0.7T and less than 1.0T.

8 Claims, 6 Drawing Sheets

*1: FOREFRONT PULSE
*2: MULTI-PULSES

Fig. 4

CASE OF 6T DATA

Fig.5(a) CASE WHERE THE FOREFRONT PULSE IS TOO LONG, AND THE BALANCE IS POOR

BEAM SCANNING DIRECTION

Fig.5(b) CASE WHERE THE THERMAL BALANCE IS GOOD

Fig.5(c)

Fig.5(d) CASE WHERE THE GROOVE WIDTH IS TOO WIDE

OPTICAL RECORDING METHOD AND OPTICAL RECORDING MEDIUM

BACKGROUND OF THE INVENTION

1. Field of the Invention

The present invention relates to an optical recording method which makes high velocity recording possible to an optical recording medium having a recording layer containing an organic colorant and which supplements a deficiency in recording sensibility to realize good recording/readout characteristics.

2. Discussion of Background

In recent years, there has been a progress in shortening of the wavelength of a laser beam to be used for recording/readout, in order to improve the recording density of an optical recording medium. Namely, the research and developments have been advanced from an optical recording medium which can be recorded and readout by a laser beam with a wavelength of about 780 nm or 830 nm as currently commonly employed, to DVD employing a semiconductor laser beam with a wavelength of from 640 nm to 680 nm, or further to an optical recording medium which can be recorded and readout by a laser beam of 600 nm or less.

Such an optical recording medium may be of a write-once type on which recording is possible only once, or of a rewritable type on which recording/erasing can be repeated. For example, as a write-once type, an organic colorant type optical recording medium containing an organic colorant in its recording layer may be mentioned, and as a rewritable type, a magneto-optical recording medium employing photomagnetic effects, or a phase-change type optical recording medium utilizing a change in reflectance caused by a reversible change between an amorphous state and a crystalline state, may, for example, be mentioned.

With respect to an organic colorant type optical recording medium, standards have recently been established for 3.95 GB capacity of a write-once type optical recording medium (DVD-R) on which recording/readout is carried out by a laser beam with a wavelength in the vicinity of 640 nm. As shown partially in such written standards, a method has been established to control the timing of the edges of recorded marks in mark length modulation recording, by dividing the incident laser beam for optical recording into multi-pulses. Also with respect to a recording apparatus, an optimum system for high density recording has been practically developed.

For example, FIG. 27 in Tech. Rep. IEICE CPM 96-152 (1997) discloses a case wherein, at a recording linear velocity of about 3.5 m/s, the length of the forefront pulse of the recording beam is adjusted to be from 1.3T to 1.5T (wherein T is the reference clock period) and the second and subsequent pulses (multi-pulses) are adjusted to be from 0.6T to 0.7T.

While there is a recording medium having a very small recording linear velocity dependency of recording characteristics (hereinafter referred to as "recording linear velocity dependency"), like a phase-change type optical recording medium, an organic colorant type optical recording medium has a large recording linear velocity dependency and thus is barred from high speed recording.

For example, when recording is carried out on a GeSbTe type phase-change type optical recording medium (hereinafter sometimes referred to simply as a "phase change medium") by adopting one type of "pulse strategy for recording" (hereinafter referred to simply as a "pulse strategy") at a recording linear velocity of 1.4 m/s, 5.6 m/s or 10 m/s, the optimum recording power at each velocity is about 11 mW, 12 mW or 13 mW, respectively, and thus the difference in the recording sensitivity is small.

On the other hand, in the case of an organic colorant type optical recording medium such as DVD-R, if recording is carried out at each of the above velocities by employing the conventional pulse strategy (the basic strategy in 3.95 GB written standards for DVD-R), the optimum recording power is 3 mW, 12 mW or 15 mW or higher. Thus, the change in recording sensitivity to the recording velocity is very large.

Figure 1:
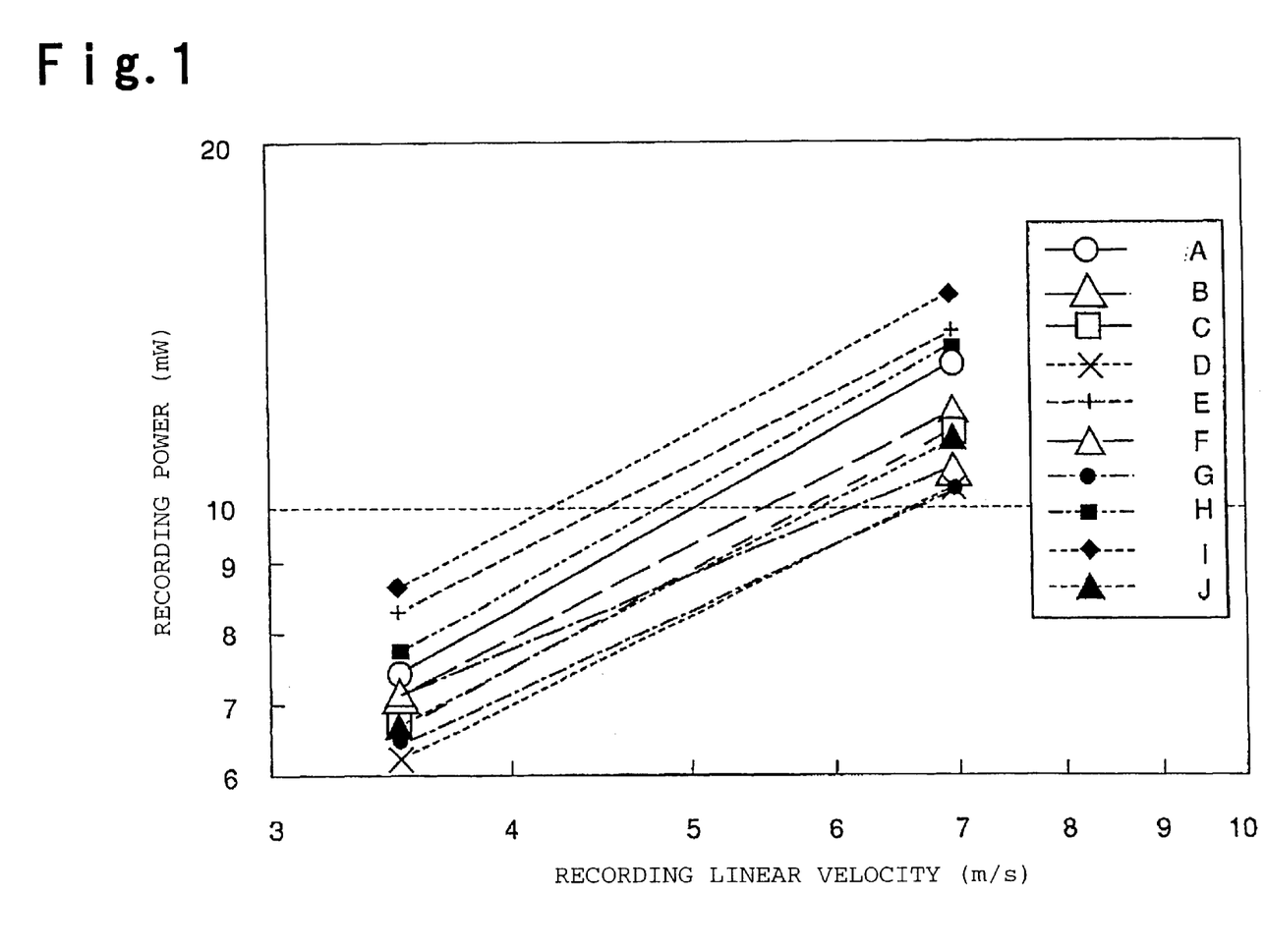
FIG. 1 is a graph showing the recording linear velocity dependency of the recording sensitivity in recording on an organic colorant type optical recording medium employing a conventional pulse strategy.

FIG. 1 shows the optimum recording powers when recording was carried out at a 1-time velocity (recording linear velocity: 3.5 m/s) and at a 2-times velocity (recording linear velocity: 7.0 m/s) using a recording beam with a wavelength of 635 nm employing the same pulse strategy (the basic strategy for 3.95 GB written standards for DVD-R) on ten types of DVD-R differing in the colorant contained in the recording layer. From this Figure, it is evident that the recording linear velocity dependency of the organic colorant type optical recording media does not depend on the type of the colorant.

The optical recording laser has been improved to a substantial extent, but a laser of a high power is not yet widely employed. In a practical recording apparatus, the recording power is at a level of about 15 mW at the maximum, in many cases, when a laser having a wavelength of from 600 to 700 nm is employed. Further, a recording laser of from 400 nm to 500 nm which has recently been commercialized, has a limit at a level of 14 mW at present. Under these circumstances, such a large recording linear velocity dependency is a serious problem for the organic colorant type optical recording medium.

As observed in the case of a semiconductor laser having a wavelength of 780 nm which is used for recording/readout of CD-R, it may be possible that improvement of the power of a semiconductor laser can be realized in a very short period of time. However, it is expected that even if in a near future a semiconductor laser of high power at a level of at least 20 mW with e.g. a wavelength of from 600 to 700 nm will be practically developed, recording at a higher velocity at a level of 21.0 m/s (corresponding to 6-times velocity in the DVD type optical recording medium) or 28.0 m/s (corresponding to 8-times velocity in the DVD type optical recording medium) may not be accomplished merely by the improvement of the recording power.

Generally, there are two methods for solving the above problems.

Firstly, a method of inventing a pulse strategy i.e. setting of pulses or pulse trains for emission of a recording laser beam to be used for recording, may be mentioned. Such a method is disclosed, for example, in Electronic Materials (1996) June edition, p 50, 3.95 GB written standards for DVD-R (ver. 1.0), and JP-A-11-195242. In these publications, a pulse strategy wherein the pulse division into (n−2) pulses is the base, and the forefront pulse is from 1.2T to 1.5T, and multi-pulses are from 0.6T to 0.7T, and a recording linear velocity of 3.5 m/s (1-time velocity recording), are employed. The recording system employing this pulse pattern is not sufficient to overcome the recording linear velocity dependency, although it is extremely effective to overcome another problem of the organic colorant type optical recording medium i.e. to reduce the difference in recording sensitivity between a long mark and a short mark caused by the small thermal conductivity of the colorant layer (recording layer).

Another method for solving the problem of the recording linear velocity dependency is to select the construction of the organic colorant type optical recording medium, for example, to select the colorant or the material for the reflective layer.

In the case of the organic colorant type optical recording medium, the thermal conductivity of the colorant contained in the recording layer, itself, is small, whereby, as compared with an inorganic type recording layer of e.g. a phase-change medium, the remaining heat effect in the scanning direction by the recording laser beam, is small. Further, usually, a metal reflective layer of high thermal conductivity is laminated, whereby cooling by heat dissipation in the direction from the recording layer to the reflective layer, is substantial. For these two reasons, from its construction, the recording linear velocity dependency is large as compared with e.g. the phase-change medium.

The following measure is, for example, conceivable to overcome such a drawback:

1) a metal having a smaller thermal conductivity than gold (among the metal reflective layers practically used for optical recording media at present, the thermal conductivity is smallest) is used as a reflective layer, and further, the thickness of such a reflective layer is made thinner than 60 nm which is considered to be the critical thickness for a metal layer practically serving as a reflective layer);

2) the colorant contained in the recording layer is changed to an organic colorant having a high absorbance at the recording wavelength, i.e. changed to a recording layer having a larger extinction coefficient at a recording/readout wavelength; or 3) an interlayer having a low thermal conductivity, of e.g. a nitride, is provided between the metal reflective layer and the recording layer.

However, in each case, the change is to such a direction that the reflectivity of the optical recording medium becomes substantially lower than the conventional organic colorant type optical recording media (CD-R, DVD-R). It is not desirable to overcome the recording linear velocity dependency by such a method, if the interchangeability with a ROM medium as one of substantial merits of the current organic colorant type optical recording media, i.e. interchangeability of CD-R with CD or interchangeability of DVD-R with DVD, is regarded to be of importance.

If diversification of products will advance, and interchangeability with a ROM medium will not be so important, and a demand for an organic colorant type optical recording medium of low reflectivity type will be created, the above-mentioned measures 1) to 3) to overcome the recording linear velocity dependency, will not be particularly problematic.

SUMMARY OF THE INVENTION

The present inventors have studied the conditions for application time of a laser for recoding, which are effective to supplement a deficiency in recording sensitivity during high velocity recording on a usual organic colorant type optical recording medium and to supplement a deficiency in sensitivity of an organic colorant type optical recording medium having a relatively poor recording sensitivity. At the same time, they have studied how to control adverse effects such as a deterioration in C/N of wobble (an increase of noise) due to a substantial increase of modulation by high velocity recording, and a deterioration in the quality of address signals of e.g. LPP (landprepits) after the recording.

As a result, they considered it necessary to adjust the time for the forefront pulse in the pulse train to be longer than ever with a laser beam divided into pulses to be irradiated for recording and to adjust also multi-pulses to be longer, to take a thermal balance in the longitudinal direction of recorded marks.

Namely, the present invention provides an optical recording method for an optical recording medium having a recording layer containing an organic colorant on a transparent substrate, which comprises applying a recording laser beam divided into n−2 (wherein n is an integer of at least 2) pulses (or into 1 pulse when n is 2), to the optical recording medium, to form a mark having a recording data of nT (wherein T is the reference clock period), wherein the length of the forefront pulse is at least 1.7T and at most 2.4T, and the lengths of the second and subsequent pulses (multi-pulses) are at least 0.7T and less than 1.0T.

Further, the present invention provides an optical recording medium on which recording can be made by such an optical recording method, and an optical recording medium having recording made by such an optical recording method.

DETAILED DESCRIPTION OF THE PREFERRED EMBODIMENTS

The present invention is characterized in that in recording on so-called DVD-R, divided respective pulse lengths are made longer than in the conventional recommended pulse strategy, whereby recording at a higher linear velocity is made possible on an organic colorant type optical recording medium. The present invention is effective particularly when the recording linear velocity is at least 9.0 m/s. Further, it is particularly effective when random mark length modulation recording of EFM+modulation (8-16 modulation) is carried out wherein the shortest mark length is defined by from 0.30 λ/NA (μm) to 0.45 λ/NA (μm) (wherein NA (numerical aperture)=0.6 to 0.8, and λ (recording/readout wavelength)= 0.40 to 0.70 μm).

The present invention is effective for forming a mark having a length nT (wherein n is an integer of at least 2). However, the effect of the present invention becomes more distinct when n is an integer of at least 3.

Now, the present invention will be described in detail with reference to recording on DVD-R as an example.

In the present invention, for example, in a case where random mark length modulation recording of EFM+ modulation (8-16 modulation) wherein the shortest mark length is defined by from 0.30 λ/NA (μm) to 0.45 λ/NA (μm) (wherein NA=0.6 to 0.8, and λ=0.40 to 0.70 μm) is carried out, the application time of a laser power for recording a mark having a length nT (wherein n is an integer of from 2 to 14), is divided into a pulse train of n−2 pulses (or one pulse when n=2) represented by a (n, 1), α (n, 2), α (n, 3) . . . α (n, n−2), and the time length of the forefront pulse α (n, 1) of each pulse train is adjusted to be at least 1.7T and at most 2.4T, relative to the reference clock period T, and the time lengths of α (n, 2) to α (n, n−2) are adjusted to be at least 0.7T and less than 1.0T. Further, in this specification, α (n, k) represents a function wherein a represents the time, n corresponds to n in the pulse length nT, and k represents the number of the pulse in the pulse train.

Figure 3:
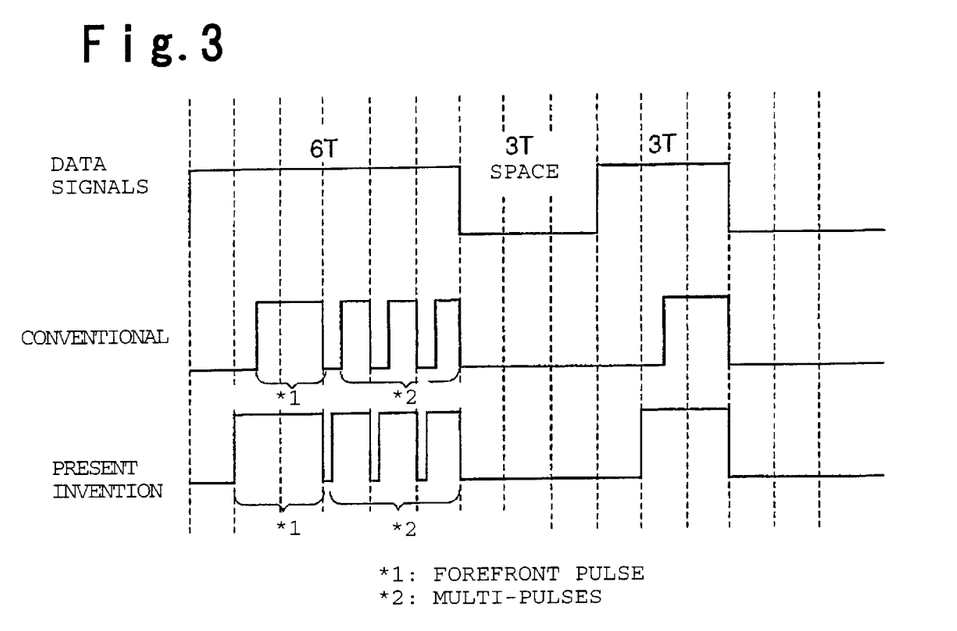
FIG. 3 is a diagram illustrating the difference between the conventional pulse strategy and the pulse strategy of the present invention.
Figure 4:
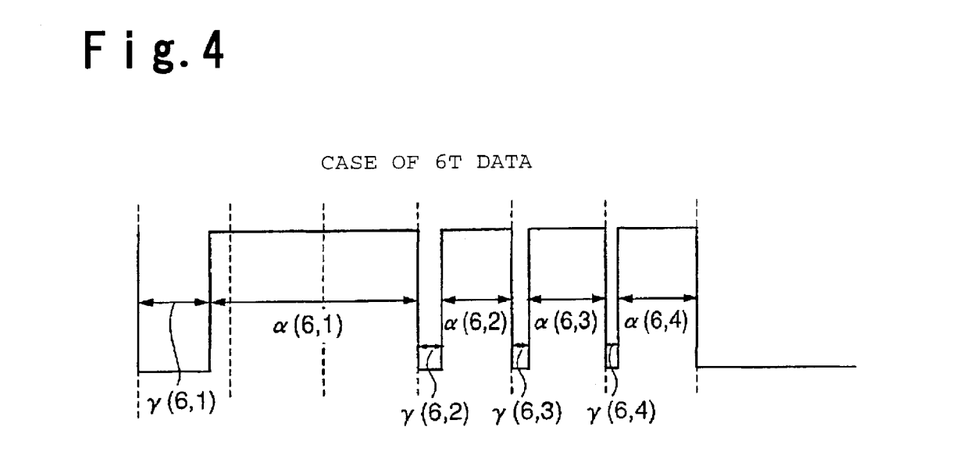
FIG. 4 is a diagram illustrating the respective parameters (α and γ) of the pulse strategy of the present invention.

Here, α (n, 1) corresponds to one represented by $nT_{top}$ in the conventional written standards for DVD-R, and α(n, 2) to α (n, n−2) correspond to ones represented by $nT_{multi}$. Those notations are depicted in FIG. 3 and FIG. 4.

In a case where a laser beam having a wavelength of from about 400 to 700 nm is used as the recording/readout wavelength, the shortest mark length is within a range of from 0.30 λ/NA (μm) to 0.45 λ/NA (μm) (wherein NA=0.6 to 0.8, and λ=0.40 to 0.70 μm) from its detectable limit (the carrier level being preferably at least 50 dB). However, to secure interchangeability with DVD-ROM, the shortest mark length is usually made to be 0.40 μm. In such a case, it is known that when the recording velocity is adjusted to be 3.5 m/s (1-time velocity), and 1T (the reference clock period) at that time is set to be 38.2 ns, the shortest mark length (3T) will be about 0.40 μm, and the recording capacity per sheet of DVD-R will be 4.7 GB.

Accordingly, in the case of DVD-R, in order to increase the recording velocity while maintaining the recording capacity of 4.7 GB, 1T for 2-times velocity, 3-times velocity and 4-times velocity recording will be 19.1 ns, 12.7 ns and 9.6 ns, respectively. The present invention is described basically with reference to examples in which recording is carried out on DVD-R of 4.7 GB at a recording linear velocity of from 1-time velocity to 4-times velocity.

In particular, when the shortest mark length is adjusted to be 0.35 μm, the rotational speed (linear velocity) in the optical recording method may be lowered without changing the clock frequency, or the clock frequency may be increased to shorten the length of 1T, without changing the rotational speed.

The pulse strategy of the present invention is the same as the conventional pulse strategy in the divided number of pulses. However, this divided number has been found to be far effective when it is used for high linear velocity recording than when it is used for low linear velocity recording, since thermal interference can thereby be remarkably reduced.

Figure 2:
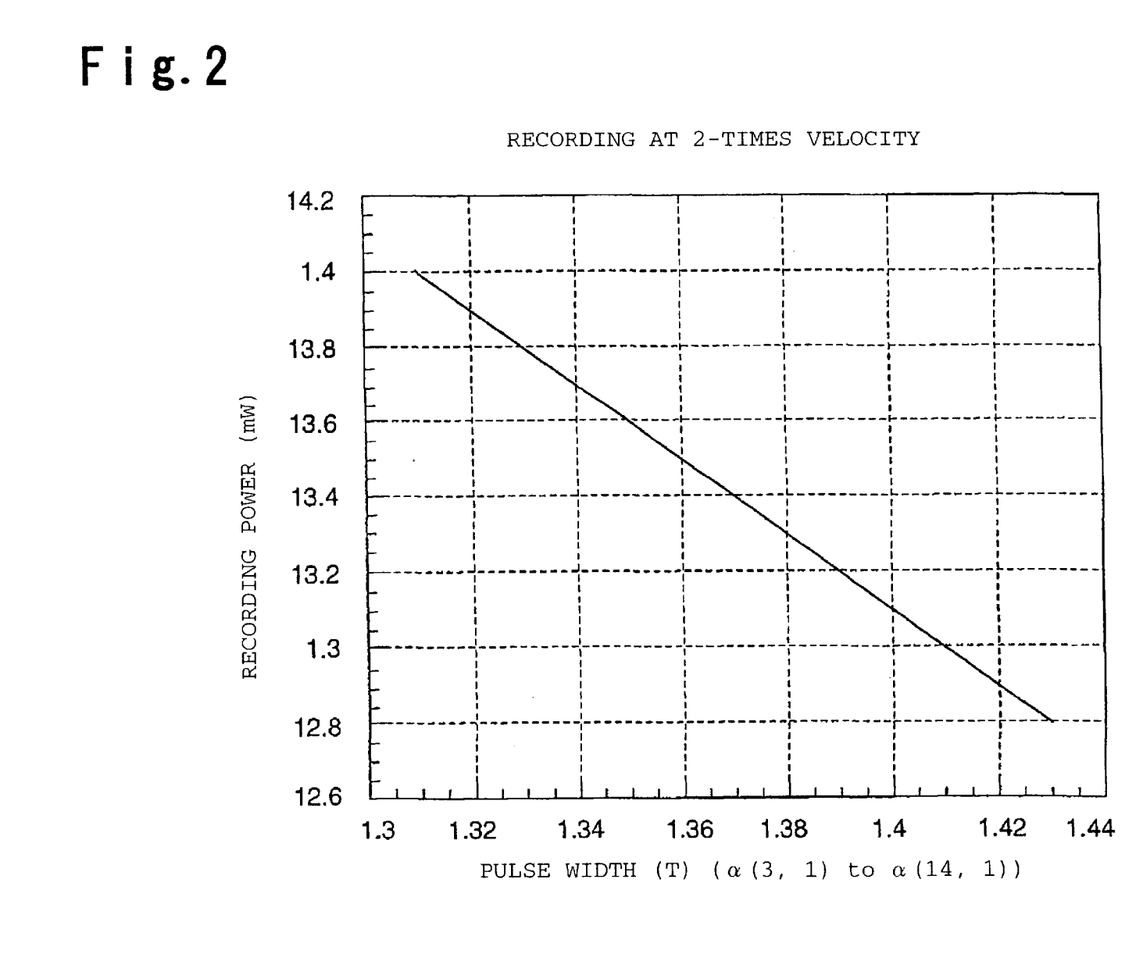
FIG. 2 is a graph showing the relation between the length of α (n, 1) and the recording sensitivity.

Further, as shown in FIG. 2, when random signals represented by EFM+modulation recording are to be recorded, the laser power required for recording can be reduced, as α (n, 1) is adjusted to be long. For example, it is extremely effective to adjust α (n, 1) to be longer than from 1.2T to 1.5T which has heretofore been known as a pulse strategy for DVD-R, in order to supplement the sensitivity in high linear velocity recording, or in order to supplement the sensitivity of an optical recording medium having such poor recording sensitivity that the absorption coefficient (k) is so small that recording is impossible even at a low linear velocity.

In the pulse strategy of the present invention, α (n, 1) of the forefront pulse is at least 1.7T and at most 2.4T. Taking recording at 4-times velocity (14.0 m/s) or higher into consideration, α (n, 1) is preferably at least 1.8T and at most 2.4T, more preferably at least 1.9T and at most 2.4T.

Figure 5A:
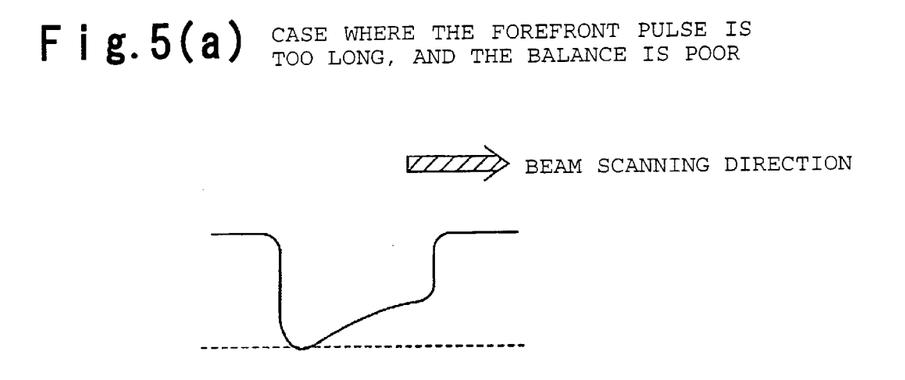
FIGS. 5(a) to 5(d) are diagrams illustrating the waveform distortions in the readout waveforms by an oscilloscope of the mark lengths of from 6T to 11T.

If α (n, 1) is shorter than 1.7T, an adequate recording sensitivity can not be obtained in recording at a high linear velocity, as an object of the present invention, and recording at a 3-times velocity (9.0 m/s) or higher will be impossible with a power of 15 mW or lower which is a common emission power of a recording laser. Further, if it is longer than 2.4T, the power given as the forefront pulse tends to be too high as compared with the multi-pulses, even if the lengths of multi-pulses are substantially 1.0 T. Accordingly, it tends to be difficult to take a thermal balance between the initial end portion and the final end portion of a recorded mark, whereby a distortion as shown in FIG. 5(a) will form in the readout waveform of the long mark, and jitter tends to deteriorate. The waveform distortion tends to be remarkable in the case of a long mark.

Figure 6A:
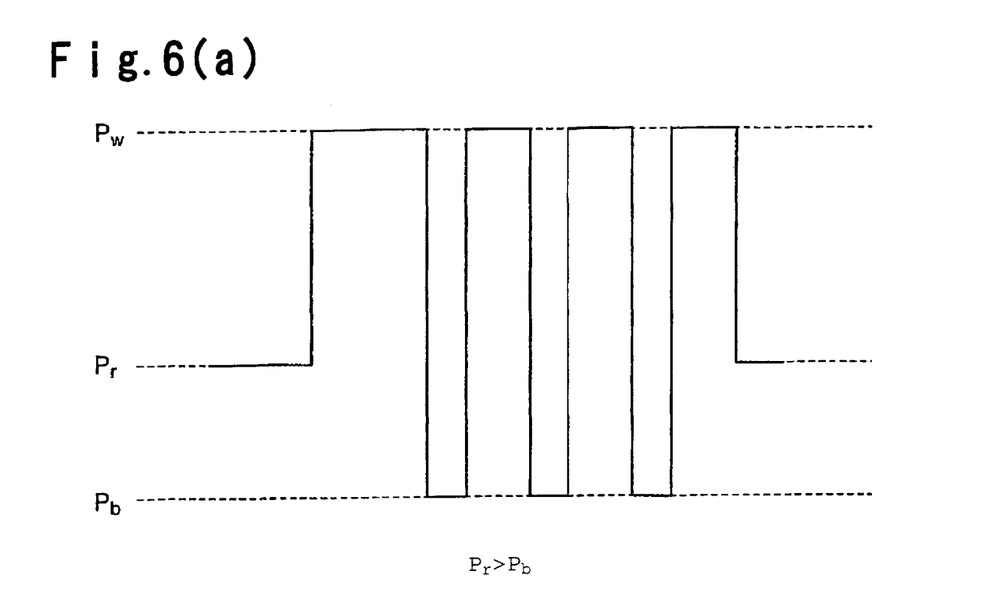
FIGS. 6(a), 6(b) and 6(c) are diagrams illustrating readout power $P_r$ and bias power $P_b$.
Figure 6B:
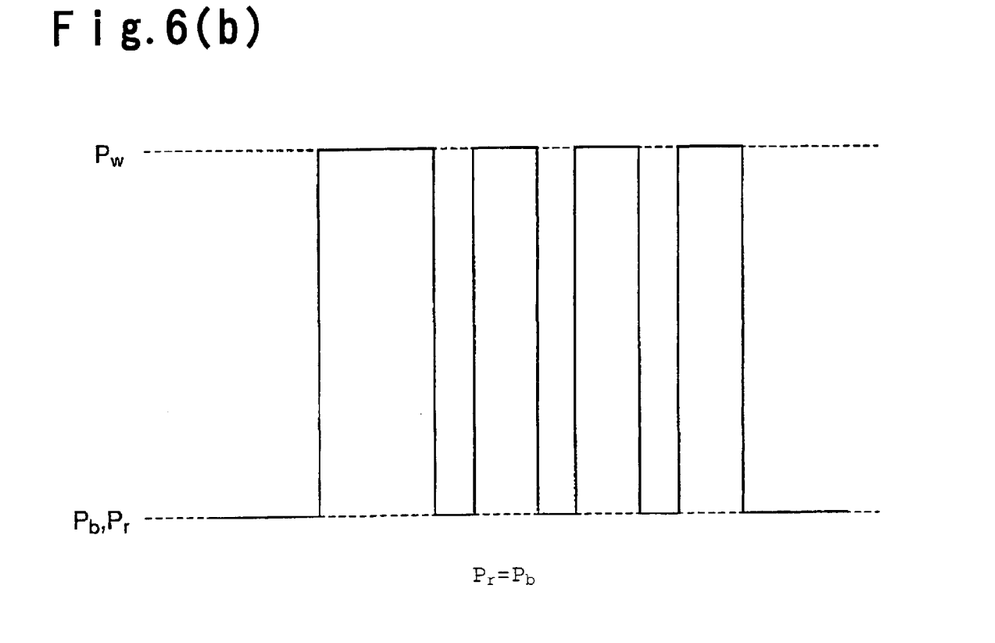
Figure 6C:
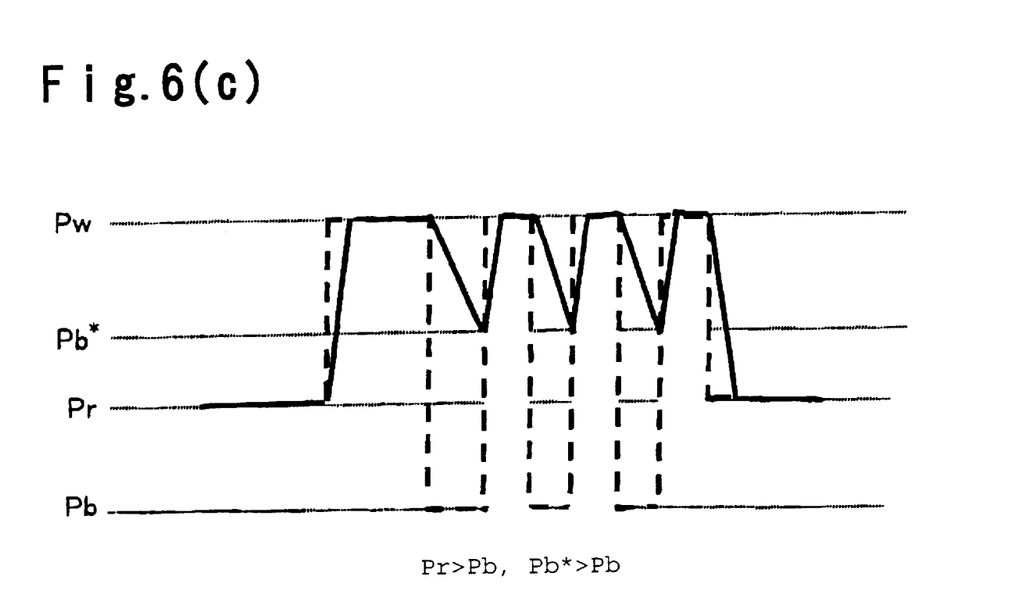

FIGS. 6(a) to 6(d) are diagrams illustrating the waveform distortions in the readout waveforms by an oscilloscope of the recorded marks. FIG. 6(a) illustrates an undesirable case where a large distortion is observed in the readout waveform corresponding to the front end of the recorded portion (mark), and FIG. 6(b) illustrates a case of a preferred readout waveform where the thermal balance is good. FIG. 6(c) illustrates a case where a certain distortion is observed in the readout waveform corresponding to the rear end of the recorded portion, but the distortion of such a degree is not problematic, and FIG. 6(d) illustrates an undesirable case where a large distortion is observed in the readout waveform corresponding to the rear end of the recorded portion.

FIG. 6(a) shows a readout waveform which is likely to form when the forefront pulse is too long as compared with the multi-pulses or when the multi-pulses are too short, and FIG. 6(d) shows a readout waveform which is likely to form when the multi-pulses are too long, or the forefront pulse is too short, or when a recording layer containing a colorant having a large heat release value is provided on a substrate having a guide groove having a groove width which is too wide. When the forefront pulse α (n, 1) is set to be at least 1.7T and at most 2.4T, if the multi-pulses α (n, 2) to α (n, n−2) are set to be from 0.6T to 0.7T as heretofore common, the readout waveform of a long mark of at least 6T will have a large distortion as shown in FIG. 5(a). Therefore, the timing for the edges (the initial end portion and the final end portion) of each recorded mark of nT tends to disagree, whereby jitter tends to be high.

To overcome such a drawback, the multi-pulses are adjusted to be at least 0.7T and less than 1.0T, more preferably at least 0.8T and at most 0.9T, in order to remove the influence of instability by the rising/falling of the emission of the recording laser, whereby the readout waveform of the shape shown in FIG. 6(b) or 6(c) can be obtained, and recording with good jitter can be carried out where the timing of the edges of each recorded mark of nT is good. By the way, in a recording apparatus to carry out the recording method of the present invention, the time required for the rising and falling of the emission of a semiconductor laser as a light source of the recording laser beam, is preferably at most 5 ns, more preferably at most 3 ns.

The distortion of the readout waveform of the above-mentioned long mark depends to some extent on various properties of the colorant in the recording layer. For example, when a colorant which has a small heat release value or is endothermic at the time of decomposition of the colorant by irradiation with a recording laser beam, or a colorant having a small absorbance and extinction coefficient at the recording wavelength, is employed, the distortion of the readout waveform of the recorded signals tends to be close to FIG. 5(b), such being desirable. FIG. 3 shows a comparison between the pulse pattern of the present invention and the conventional pulse pattern. And, in order to obtain a wide jitter margin and a lower jitter value, it is preferable to set different optimized values of α (3, 1), α (4, 1) and α (5, 1) to α (14, 1), or α (3, 1), α (4, 1), α (5, 1) and α (6, 1) to α (14, 1).

In the pulse strategy of the present invention, an "intermark compensation" (or "write compensation") may be carried out so that the forefront pulse is shortened by about 1 ns only at the time of recording 3T to 14T marks after a 3T space.

In order to satisfy such conditions and in view of simplicity in designing the pulse strategy, off pulse intervals, e.g. γ (n, 2) to γ (n, n−2) in the pulses for recording a 6T mark shown in FIG. 4, are preferably more than 0T and at most 0.3T, independently from one another. If the off pulse intervals γ (n, 2) to γ (n, n−2), particularly γ (n, n−2), are longer than the above range, the pulse emission circuit tends to be complicated, although such may be effective in that heat accumulation at the final end portion can be reduced particularly at the time of recording a long mark.

In order to secure a jitter margin, it is preferred to change the pulse strategy depending upon the recording linear velocity.

For example, the pulse strategy may be changed as follows:

At a recording linear velocity of from 3.0 to 4.0 m/s (substantially corresponding to 1-time velocity in the DVD-R standards), the length of the forefront pulse is adjusted to be at least 1.0T and at most 1.6T, and the lengths of multi-pulses are adjusted to be at least 0.6T and at most 0.7T;

At a recording linear velocity of from 6.0 to 8.0 m/s (substantially corresponding to 2-times velocity in the DVD-R standards), the length of the forefront pulse is adjusted to be at least 1.3T and at most 1.7T, and the lengths of multi-pulses are adjusted to be at least 0.6T and at most 0.7T; and At a recording linear velocity of from 9.0 to 28.0 m/s (substantially corresponding to 3-times to 8-times velocities in the DVD-R standards), the length of the forefront pulse is adjusted to be at least 1.7T and at most 2.4T (more preferably, at least 1.9T and at most 2.4T), and the lengths of multi-pulses are adjusted to be at least 0.7T and less than 1.0T (more preferably at least 0.8T and at most 0.9T).

In this example, the pulse strategy of the present invention is employed in the case where the recording linear velocity is at least 9.0 m/s.

By changing the pulse strategy to be used, depending upon the linear velocity, in such a manner, the recording linear velocity dependency of an organic colorant type optical recording medium can be compensated more completely, such being desirable. This is particularly effective when random mark length modulation recording of EFM+modulation (8-16 modulation) is carried out wherein the shortest mark length is defined by from 0.30 λ/NA (μm) to 0.45 λ/NA (μm) (wherein NA=0.6 to 0.68, and λ=0.60 to 0.70 μm).

Changing the pulse strategy depending upon the recording linear velocity in such a manner, is effective also in the case of constant angular velocity (CAV) recording.

Further, in the case of recording at 1-time velocity and 2-times velocity on e.g. DVD-R, recording can usually be made with pulse strategies which are close to each other, and in such a case, at both recording linear velocities, recording may be carried out within the range of the pulse strategy of the present invention.

As the recording linear velocity increases to 3-times velocity or 4-times velocity, the manner of formation of recorded marks becomes substantially different from recording at 1-time velocity or 2-times velocity. Besides, with most of current DVD-R, the reflectivity is at least 40%, which is a high reflectivity as compared with other optical recording media, whereby the recording sensitivity is relatively poor among various optical recording media. Therefore, by changing the pulse strategy within a wide range as described above depending upon the recording linear velocity, it becomes possible to obtain good recording characteristics in a range of from 1-time velocity to 4-times velocity on a single sheet of medium.

Further, in the pulse strategy for recording at 3-times velocity, at least the forefront pulse is preferably set to be longer, specifically at least 1.7T, than the pulse strategy for recording at 1-time velocity or 2-times velocity. Namely, in the case of an organic colorant type optical recording medium, as is different from a phase-change medium represented by GeSbTe, a large recording power will be required as the recording linear velocity increases, and by using a large recording power, the modulated amplitude tends to extremely increase. The extreme increase of the modulation tends to deteriorate the signal quality (C/N) of wobble for synchronizing rotation and tends to deteriorate the signal quality of e.g. LPP for address. Therefore, at a high linear velocity recording at a velocity of at least 3-times velocity, the laser power required for recording can be lowered by setting the forefront pulse to be longer, as in the present invention. Accordingly, it becomes more readily possible to prevent an extreme increase of modulation.

In the present invention, the "modulated amplitude" and the "optimum recording power" mean a modulation ($I_{14}/I_{14}H$) and a recording power when the value of β (the ratio of the difference between the average output of amplitude in the readout signal waveform of the longest mark and the same average output of the shortest mark, to the maximum output voltage in the readout signal waveform of a random signal recorded portion) is within a range of ±2% when recorded random signals of EFM+modulation are readout by the same pickup as used for recording. Further, the reflectivity represents a reflectivity at a wavelength of 647 nm when a track recorded with the above-mentioned optimum recording power, is readout by a readout apparatus in accordance with DVD-ROM standards.

In order to obtain the effects of the recording method of the present invention distinctly, it is preferred to employ an optical recording medium whereby the difference in the modulated amplitude is at most 10% (particularly less than 10%) as between recording at a recording linear velocity of X-times velocity and recording at a recording linear velocity of (X+1)-times velocity. If the difference in the modulated amplitude exceeds 10%, even if AR (an index of signal quality of LPP, preferably at least 15%) is 20% or higher in accordance with DVD-R standards ver. 1.0 in recording at a recording linear velocity of 1-time velocity or 2-times velocity, it sharply decreases to a level of 10% at 3-times velocity and less than 10% at 4-times velocity, whereby tracking or writing for recording is likely to be impossible. Further, it is likely that the wobble is scraped off by recorded marks, and the noise of C/N thereof tends to increase, whereby it becomes difficult to satisfy 30 dB (more preferably at least 35 dB) which is a preferred C/N range.

To obtain an optical recording medium having such characteristics, the colorant contained in the recording layer, or the shape of a guide groove formed on the substrate, may suitably be adjusted.

For example, it may be mentioned to employ a recording layer containing, as the main component, a colorant which has the absorption maximum at a relatively short wavelength as compared with a colorant commonly used for a recording layer of DVD-R and which has an absorbance at a recording wavelength lower than the colorant A, or containing, as the main component, the colorant A which is commonly used for a recording layer of DVD-R and having a small amount of a colorant B incorporated which has an absorption maximum wavelength shorter than the colorant A and which has an absorbance smaller than the colorant A at the recording wavelength.

A colorant having a relatively large absorbance at the recording wavelength (which corresponds to the colorant A among the above colorants A and B), efficiently absorbs a recording laser beam, whereby recording can be made at a low power (i.e. the recording sensitivity is good), but the temperature rising rate by irradiation with a laser beam, is high, whereby a recorded mark broadened in a transverse direction (a radial direction) is likely to be formed, and the modulated amplitude tends to increase. In the case of a colorant type optical recording medium, the recording power usually increases as the recording velocity increases, and for the above-mentioned reason, the increase of the modulated amplitude is likely to be accelerated.

Accordingly, by incorporating a dye having a relatively small absorbance at the recording wavelength (which corresponds to the colorant B among the above colorants A and B), it is possible to suppress the increase of the modulation while securing the recording sensitivity.

Further, it is possible to suppress the increase of the modulated amplitude due to an increase of the recording linear velocity, by making the guide groove on the substrate relatively deep. By making the groove deep, broadening of the recorded mark in a traverse direction can be physically suppressed, and the reflectivity at a non-recorded portion becomes low, and the modulated amplitude during low linear velocity recording will increase, whereby the difference from the modulated amplitude during high linear velocity recording can be made small. Specifically, while media having guide grooves with a depth of from 150 to 160 nm are common among conventional optical recording media, a substrate having a guide groove with a depth of at least 160 nm, preferably from 170 to 180 nm, may be employed.

By suitably combining such conditions, it is possible to obtain an optical recording medium whereby the difference in the modulated amplitude is at most 10% as between recording at a recording linear velocity of X-times velocity and recording at a recording linear velocity of (X+1)-times velocity.

Further, in order to obtain good jitter by reducing thermal interference, it is effective to change the ratio of the readout beam power (readout power $P_r$; see FIG. 6(a) and FIG. 6(b)) to the laser power (the bias power $P_b$; see FIG. 6(a) and FIG. 6(b)) irradiated during off pulse intervals $\gamma$ (n, 2) to $\gamma$ (n, n−2) depending upon the recording linear velocity, specifically to increase the ratio in the case of high linear velocity recording over the case of low linear velocity recording. At 1-time velocity recording, $P_r/P_b=1.0$ is a common condition of laser power setting, including written standards for DVD-R. At 2-times velocity recording, the laser power setting as $P_r/P_b$ may be 1.0, but at 3-times velocity or higher, $P_r/P_b>1.0$ is preferred, and $P_r/P_b>2.0$ is more preferred.

However, as the recording linear velocity becomes high, the off pulse interval becomes short. Accordingly, it may happen that the rising time for the recording laser beam (emitted light) to reach a predetermined power (Pw in FIG. 6) or the falling time from that power, becomes close to the time of the off pulse interval, and before the laser power at the off pulse interval $\gamma$ (n, k) has decreased to the predetermined value Pb, the next multi-pulse section $\alpha$ (n, k) starts (see FIG. 6(c)).

In order to obtain good characteristics in recording at a linear velocity of at least 14.0 m/s (corresponding to 4-times velocity in DVD-R) even when the waveform of the input signal for laser driving is different from the waveform of the actually emitted pulse, and the bias power Pb* of the emitted pulse does not reach the predetermined value Pb, it is preferred to satisfy Pb*/Pw<0.8 with respect to the recording power Pw. More preferably, Pb*/Pw<0.5, particularly preferably Pb*/Pw≦0.4.

Now, the construction of an optical recording medium suitable for the optical recording method of the present invention will be described.

The optical recording medium to be used in the present invention may be any medium so long as it is at least one having a recording layer containing an organic colorant on a transparent substrate. As an example, as described above, an optical recording medium having a recording layer containing an organic colorant, a metal reflective layer and a protective layer sequentially laminated on a transparent substrate, may be mentioned, and as particularly preferred, DVD-R may be mentioned. As the transparent substrate for the optical recording medium to be used in the present invention, a known substrate made of e.g. a resin such as polycarbonate, polymethacrylate or non-crystalline polyolefin, may be employed, and it has a guide groove for a tracking servo. The depth of the groove is preferably from 80 to 180 nm, and the track pitch is preferably from 0.4 to 0.9 µm. The shape of the groove is preferably a U-shape groove.

In the case of an optical recording medium for recording/readout at a wavelength of from 600 nm to 700 nm, the depth of the groove is preferably from 100 to 200 nm, more preferably from 140 to 180 nm, particularly preferably from 140 to 170 nm.

Further, as an optical recording medium for recording/readout at a wavelength of from 400 nm to 500 nm, the depth of the groove is preferably from 80 to 150 nm. If the depth of the groove is less than 80 nm, there may be a case where it tends to be difficult to obtain an adequate modulated amplitude or to obtain adequate push-pull signals. If the upper limit exceeds 80 nm, it tends to be difficult to obtain a sufficient reflectivity and to maintain the transfer property during the production of a substrate.

Further, if the track pitch is less than 0.7 λ/NA wherein λ is the recording/readout wavelength, and NA is a numerical aperture, there may be a case where no adequate amplitude of push-pull signals can be obtained, and there will be a problem in tracking. Further, cross talk tends to increase, whereby no good recording/readout characteristics may be obtained, and the error rate may increase. Accordingly, in the case of the present invention where the recording/readout beam wavelength is from 0.40 to 0.70 µm and the numerical aperture is from 0.6 to 0.8, the track pitch is preferably from 0.4 to 0.9 µm.

The groove width (the half-value width i.e. the groove width at a position corresponding to a half of the groove depth) of the guide groove formed on the transparent substrate is preferably within a range of from 0.2 to 0.4 μm. If the groove width is less than 0.2 μm, a fluidized deformation of the substrate is likely to occur in the groove during the recording, whereby the waveform of a long mark tends to deform, and jitter is likely to deteriorate. If the groove width exceeds 0.4 μm, the groove will be sufficiently broad so that the recording/readout beam spot will be accommodated in the groove, whereby the reflectivity tends to be low, and the modulated amplitude tends to be inadequate. Further, if the groove width is wide, the land portion becomes correspondingly narrow and during the preparation of a transparent substrate, the resin tends to hardly enter into a narrow groove portion of the mold (corresponding to the land portion of the substrate), whereby the transfer property tends to be poor.

More preferably, the groove width is from 0.28 λ/NA (μm) to 0.31 λ/NA (μm). If it is less than 0.28 λ/NA (μm), extension of the mark to the address signal portion of e.g. LPP tends to occur. On the other hand, if it exceeds 0.31 λ/NA (μm), distortion of the readout waveform in the vicinity of the final end of a recorded mark tends to be large due to the thermal interference within the mark (accumulation of heat at the final end of the mark), whereby the tendency (FIG. 5(d)) such that the bottom of a readout waveform of from 6T to 14T tends to be deeper in the scanning direction of the beam, and the effect for reducing jitter by adjusting the edges of the mark by the pulse strategy may not be obtained. The groove profile such as the groove width or the groove depth can be measured by SEM or AFM.

The optical recording medium of the present invention is designed so that recording is carried out by irradiating a recording laser beam to the recording layer to change the reflectivity, and the readout is carried out by detecting such a change in the reflectivity. Namely, the portion of the recording layer irradiated with the recording laser beam will be heated by absorption of the laser beam and will reach the decomposition temperature of the organic colorant, whereupon the organic colorant undergoes decomposition and weight reduction, whereby the layer thickness decreases, and at the same time, the optical characteristics of that portion change. As a result, the phase of the returning beam changes, and in addition, due to the influence of the fluidized deformation of the substrate, the reflectivity is changed for recording.

The recording layer is usually prepared by spin-coating a solution obtained by dissolving the organic colorant and various additives, as the case requires, in a solvent, on a transparent substrate. As such a solvent, a solvent which is capable of dissolving the organic colorant and various additives in high concentrations and which does not erode the transparent substrate, is preferred. For example, a fluoroalcohol having at least three carbon atoms and having a boiling point of from 100 to 150° C., such as 1H,1H,3H-tetrafluoropropanol, 1H,1H,5H-octafluoropentanol, or 1H,1H,3H-hexafluorbutanol, is preferably employed. If the boiling point is lower than 100° C., the solvent tends to evaporate quickly during the spin-coating, and the coating fluid tends to hardly reach the peripheral side of the disk outside a radius of 40 mm, and the thickness distribution in the radial direction tends to be large, whereby there may be a case where good characteristics can not be obtained. Further, if the boiling point exceeds 150° C., it takes time for evaporation, and the solvent is likely to remain in the layer, whereby there may be a case where good recording jitter can not be attained.

With respect to the thickness of the recording layer, the thickness $d_l$ at the land portion is preferably from 10 nm to 100 nm, and the thickness $d_g$ at the groove portion is preferably from 60 nm to 180 nm. Further, the relation between $d_l$ and $d_g$ is preferably such that $(d_g-d_l)$=40 nm to 80 nm. Further, in the case of a high velocity recording like in the present invention, the recorded mark tends to spread transversely. Accordingly, the thickness of the recording layer on the land and on the groove should better be thinner than the conventional case, also in order to reduce cross talk, etc. Thus, more preferably, $d_1$ is from 10 nm to 30 nm, and $d_g$ is from 60 nm to 100 nm.

If $d_l$ and $d_g$ are thinner than these ranges, there may be a case where no adequate record modulation can be obtained. Further, if they exceed these ranges, the layer thickness tends to be too thick, whereby the recorded portion tends to spread in the track direction or in the land direction, and it is likely that jitter and cross talk will increase. If $(d_g-d_l)$ is smaller than 40 nm, the layer thickness at the groove portion may be too thin, and there may be a case where no adequate recording sensitivity or no adequate modulated amplitude can be obtained. Further, if it exceeds 80 nm, the radial contrast (amplitude of groove-traversing signals) is likely to be too small.

The refractive index n of the recording layer is from 2.0 to 3.0, preferably from 2.3 to 2.6, and the extinction coefficient k is preferably from 0.03 to 0.10. Like in the present invention, especially when reduction of cross talk or thermal interference in the marks in high velocity recording is required more than ever, or when it is desired to make the shortest mark length shorter than 0.40 μm of conventional DVD-R for high densification, k is preferably from 0.04 to 0.08 i.e. smaller than the extinction coefficient of the recording layer in conventional DVD-R.

The measurement of n and k of the recording layer can be carried out by the following method. On a mirror surface replica, a coating fluid for forming a recording layer is placed to cover about a half region of the disk surface, and a recording layer is formed by spin-coating. Then, on a part of this recording layer, a reflective layer is formed by sputtering, whereupon the stepped height of the reflective layer from the non-coated portion of the recording layer is measured by a three dimensional surface roughness meter (ZYGO: Maxim 5800, manufactured by Canon Inc.) to obtain the thickness of the recording layer. Then, with respect to the recording layer having no reflective layer, multiple incident angle measurements are carried out by an automatic wavelength scanning ellipsometer (MEL-30S model) manufactured by JASCO Corporation), and then, with reference to the above-mentioned layer thickness, n and k presenting a good fitting for the ellipsometer's data, are determined, and they are taken as the desired optical constants n and k.

When the depth from the recording layer surface at a land portion to the recording layer surface at a groove portion is designated as $d_{abs}$, and the depth from the interface between the recording layer and the substrate at the land portions located on both sides of a groove portion to the deepest bottom portion of said interface at the groove portion, is designated as $d_{sub}$, the ratio of $d_{abs}$ to $d_{sub}$ is preferably from 50% to 85%, more preferably from 55% to 80%. If the ratio is less than this range, the thickness of the recording layer at the groove portion tends to be too thick, whereby the reflectivity tends to be too low, or the thermal interference tends to be so large that the distances of the recording marks from one another tend to be varied depending upon the recorded mark lengths, whereby jitter tends to deteriorate.

On the other hand, if the ratio exceeds the above range, the thickness of the recording layer at the groove portion tends to be too thin, whereby push-pull signals tend to be too small, or a sufficient modulated amplitude may not be obtained.

The metal reflective layer is preferably a metal film which efficiently reflects a recording/readout laser beam passed through the recording layer, and in order for the reflectivity at from 600 nm to 700 nm not to decrease, the refractive index in a wavelength region of a recording/readout wavelength ±5 nm is preferably from 0.1 to 1.5, and the extinction coefficient k is preferably from 3 to 8. Especially when the refractive index is from 0.1 to 0.2, and the extinction coefficient is from 3 to 5, a high reflectivity can be obtained. However, when higher linear velocity recording is intended, there may be a case where the reflectivity and the thermal conductivity of the metal reflective layer will be involved. The metal reflective layer is usually formed by sputtering, and in the sputtering process, it is preferred to minimize the oxygen amount at the interface, because there are many colorants, of which the thermal decomposition behavior substantially changes by the presence of oxygen.

In the optical recording medium of the present invention, a protective layer is preferably laminated on the reflective layer to prevent formation of holes in the metal reflective layer at the recorded portion (the recorded mark) or to suppress asymmetry of deformation of the recorded portion. As the material for the protective layer, a resin curable by ultraviolet rays, is preferred. Further, the thickness of the protective layer is usually at least 1 $\mu$m, preferably at least 3 $\mu$m, to prevent curing suppression by oxygen. Further, a hot melt or an adhesive curable with ultraviolet rays, may be formed thereon in a thickness of from 10 to 20 $\mu$m, and another disk may be bonded thereto.

Further, when two disks are to be bonded, the other disk to be bonded may be a disk having exactly the same structure as the disk for recording/readout, or a disk having a protective layer laminated on a metal reflective layer of e.g. aluminum formed on a substrate. However, warpages of both disks are required to be coordinated with each other so that the tilt angle in the tangent direction to the track direction of the recording/readout surface after bonding will be not higher than 0.3°. Especially for recording at a high velocity, the tilt angle in the tangent direction is preferably less than 0.1°, and the tilt angle in the radial direction is preferably less than 0.3°.

Further, it is necessary to pay a due care to centering at the time of the bonding and to the eccentricity of the substrate itself, and it is necessary to minimize the eccentricity after the bonding to a level of not more than 20 $\mu$m. If the eccentricity exceeds the above range, a good jitter value can not be obtained unless an extremely precisely adjusted pickup (a drive having a tilt servo mechanism) is employed, whereby the error rate increases. Especially for recording at a high velocity, the eccentricity is required to be smaller, and it is more preferably not more than 10 $\mu$m, particularly preferably not more than 5 $\mu$m.

While the invention has been described in detail and with reference to specific embodiments thereof, it will be apparent to one skilled in the art that various changes and modifications can be made therein without departing from the spirit and scope thereof.

This application is based on Japanese patent application No. 2000-265158 filed on Sep. 1, 2001, the entire contents thereof being hereby incorporated by reference.

Now, the present invention will be described in further detail with reference to Examples and Comparative Examples. However, it should be understood that the present invention is by no means restricted to such specific Examples. Further, the pulse strategies and the evaluation results in the following Examples and Comparative Examples are disclosed in Tables 1 and 2.

EXAMPLE 1

By means of an evaluation machine ("DDU-1000", manufactured by PULSTEC INDUSTRIAL CO., LTD.) equipped with a semiconductor laser having a wavelength of 657 nm and NA=0.65, pulses for driving a laser were generated by an optical pulse generator ("AWG610", manufactured by Sony Tektronix Corporation), and 8/16 modulated EFM+ modulation data were recorded on a commercially available 4.7 GB DVD-R for recording at a wavelength of 635 nm for $\alpha$ (3, 1)=2.1T, $\alpha$ (4, 1) to $\alpha$ (14, 1)=2.0T and $\alpha$ (4, 2) to $\alpha$ (14, 12)=0.8T. $\gamma$ (3, 1)=0.9T, $\gamma$ (4, 1) to $\gamma$ (14, 1)=1.0T, and $\gamma$ (4, 2) to $\gamma$ (14, 12)=0.2T. The readout was carried out also by the above evaluation machine.

The recording was carried out at 2-times velocity (7.0 m/s) with the shortest mark length of 0.40 $\mu$m (1T=19.2 ns). With a recording power of 14 mW, the jitter was 10.0%, the modulation was 68%, the reflectivity at a wavelength of 647 nm was 47%, and the waveform distortion of 11T was small and close to the shape shown in FIG. 5(c).

Comparative Example 1

On the same optical recording medium as in Example 1, recording was carried out in the same manner except that the pulse strategy was changed to $\alpha$ (3, 1)=1.4T, $\alpha$ (4, 1) to $\alpha$ (14, 1)=1.4T and $\alpha$ (4, 2) to $\alpha$ (14, 12)=0.68T, whereby the recording sensitivity was poor, and even with 15 mW, the power was insufficient, and no recording was possible. (With 15 mW, $\beta$ did not reach a level where the "optimum recording power" in the present invention, can be determined.)

Further, on the same optical recording medium, recording was carried out by substantially the same pulse strategy as above, i.e. $\alpha$ (3, 1)=1.3T, $\alpha$ (4, 1) to $\alpha$ (14, 1)=1.6T and $\alpha$ (4, 2) to $\alpha$ (14, 12)=0.65T, at 1-time velocity (3.5 m/s), whereby with a recording power of 11.6 mW, the jitter was 7.9%, and thus, good recording was possible.

In the measurements in the present invention, recording was all carried out by means of the evaluation machine as disclosed in Example 1 for a radius of a disk of from 40.0 mm to 40.2 mm, and the readout was all carried out at 3.5 m/s. The recorded data were EFM+modulation data wherein n=3 to 14, the shortest mark length was 3T, and the longest mark length was 14T.

Further, in all Examples disclosed in Table 1, the laser power setting was $P_r/P_b$=1.4, and $P_r$=0.7 mW. Further, the same results were obtained when $P_r/P_b$=1.0, and $P_r$=0.7 mW.

In the case of a semiconductor laser used in Examples of the present invention and Comparative Examples, the rising time for the recording laser beam (emitted light) to reach the predetermined power (recording power) and the falling time from that power were about 3 ns, respectively. Accordingly, there was a case where, when the recording linear velocity was high at 4-times velocity in Examples, during the off pulse interval, the bias power Pb* in the actual emitted pulse did not decrease to the bias power Pb in the input signal and was larger (see FIG. 6(c)).

The value of Pr/Pb in Examples of the present invention and Comparative Examples, is a value in the input signal, and in the case of a semiconductor laser employed in Examples 1 to 12 and 14 and Comparative Examples 1 to 6, the value was set to be Pr/Pb=1.4, and when recording was carried out at 4-times velocity (14.0 m/s), the value was Pb*/Pw=0.3 to 0.4 (at γ (4, 2) to γ (4, 12)). In other cases, Pb* were equal to Pb.

EXAMPLES 2 TO 6 AND COMPARATIVE EXAMPLES 2 AND 3

On polycarbonate substrates having guide grooves within a range of a disk in-plane radius of from 23 mm to 58 mm with a track pitch of 0.74 μm, with a groove width varying within a range of from 0.29 μm to 0.31 μm and with a group depth varying within a range of from 160 nm to 170 nm, a solution containing a metal-containing azo dye was spin-coated to form a recording layer, of which the absorption maximum wavelength closest to 650 nm, was 609 nm.

The spin-coating was carried out so that the groove depth formed on the recording layer surface on the guide groove would be from 100 nm to 110 nm. Accordingly, $d_{abs}/d_{sub}$= 59% to 69%, $d_f$=15 nm to 25 nm, $d_g$=65 nm to 95 nm, $d_g-d_f$=50 nm to 70 nm, and (n, k) at a wavelength of 660 nm of the recording layer=(2.35, −0.06). On said recording layer, silver was sputtered in a thickness of 85 nm to form a metal reflective layer, and an ultraviolet curable resin ("SD-318", manufactured by Dainippon Ink and Chemicals, Incorporated) was spin-coated in a thickness of from 5 μm to 6 μm to form a protective layer. Further, via an adhesive of a slow ultraviolet ray curable type having a thickness of about 15 μm, a dummy substrate (a disk having silver sputtered and an ultraviolet ray curable resin spin-coated on the above substrate) was bonded to the ultraviolet ray curable resin layer side.

Within an area corresponding to a radius of 40.0 mm to 40.2 mm of this disk, recording was carried out using the same machine as used in Example 1 under the conditions disclosed in Table 1. The reflectivity at a wavelength of 647 nm was 45%.

EXAMPLES 7 TO 9 AND COMPARATIVE EXAMPLES 4 AND 5

On the same substrate as used in Example 2, a solution containing a different metal-containing azo dye was spin-coated to form a recording layer, of which the absorption maximum wavelength closest to 650 nm was 598 nm. The values of $d_{abs}$, $d_1$, $d_g$, $(d_g-d_1)$ and $d_{abs}/d_{sub}$ were substantially the same as in Example 2. The (n, k) of the recording layer was (2.40, −0.06) at a wavelength of 660 nm.

Then, two disks were bonded exactly in the same manner as in Example 2, and recording was carried out using the same machine as in Example 2 under the conditions shown in Table 1. The reflectivity was 53% at 660 nm.

When Examples 7 and 9 are compared with Comparative Example 6, it is evident that when the pulse strategy of the present invention is employed, even when the recording linear velocity is 3-times velocity, recording is possible with a power of not higher than 15 mW, and jitter is good at a level of 7.4% and 7.2%, whereas in Comparative Example 6 employing the conventional pulse strategy, the sensitivity of the disk is inadequate which can not be supplemented by the pulse strategy, whereby with a recording power of at most 15 mW, recording was impossible.

Further, it is evident that in Example 8 using the pulse strategy of the present invention, recording can be carried out with a recording power lower than in Comparative Example 5 using the conventional pulse strategy, and yet, jitter is lower.

TABLE 1

Figure 5B:
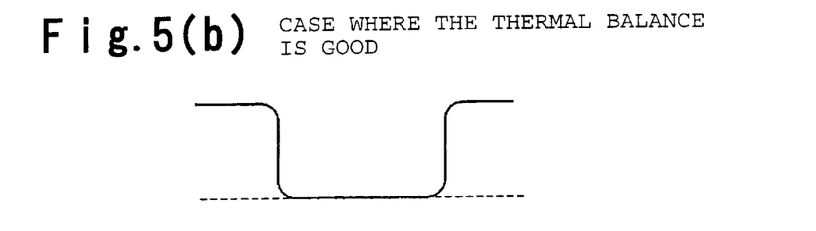
Figure 5C:
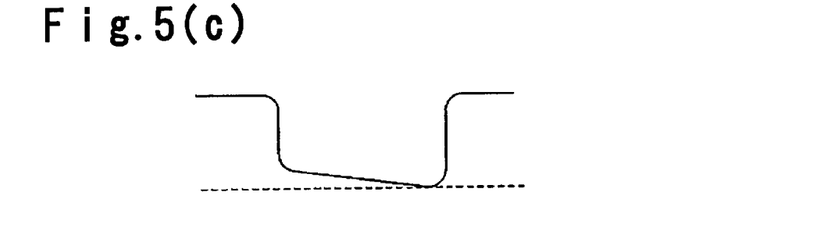
Figure 5D:
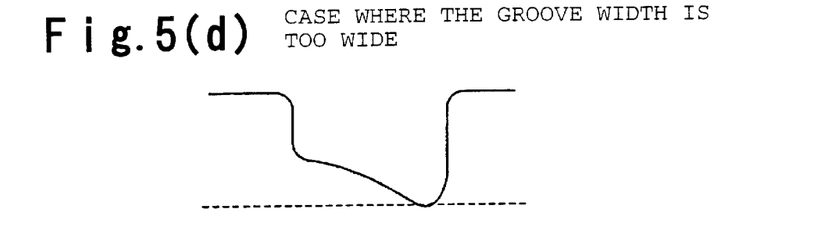

| Example | Medium | α (3, 1) | α (4, 1) to α (4, 1) | α (4, 2) to α (14, 12) | Recording velocity (m/s) | Recording power (mW) | 11T waveform type | Jitter*[3] (%) |
|---|---|---|---|---|---|---|---|---|
| Ex. 1 | ① | 2.1T | 2.0T | 0.8T | 7.0 (2-times velocity) | 14.0 | FIG. 5(c) | 10.0 |
| Ex. 2 | ② | 2.0T | 2.0T | 0.8T | 14.0 (4-times velocity) | 13.4 | FIG. 5(c) | 8.4 |
| Ex. 3 | ② | 2.1T | 2.0T | 0.8T | 14.0 (4-times velocity) | 13.2 | FIG. 5(c) | 7.8 |
| Ex. 4 | ② | 1.9T | 2.0T | 0.8T | 14.0 (4-times velocity) | 13.0 | FIG. 5(c) | 8.8 |
| Ex. 5 | ② | 2.3T | 2.3T | 0.9T | 14.0 (4-times velocity) | 12.8 | FIG. 5(b) | 9.4 |
| Ex. 6 | ② | 2.3T | 2.3T | 0.75T | 14.0 (4-times velocity) | 12.8 | FIG. 5(b) | 9.2 |
| Ex. 7 | ③ | 2.1T | 2.0T | 0.8T | 10.5 (3-times velocity) | 15.0 | FIG. 5(c) | 7.4 |
| Ex. 8 | ③ | 2.1T | 2.0T | 0.8T | 7.0 (2-times velocity) | 11.2 | FIG. 5(b) | 8.2 |
| Ex. 9 | ③ | 2.1T | 2.0T | 0.7T | 10.5 (3-times velocity) | 14.8 | FIG. 5(c) | 7.2 |

TABLE 1-continued

| Example | Medium | α (3, 1) | α (4, 1) to α (4, 1) | α (4, 2) to α (14, 12) | Recording velocity (m/s) | Recording power (mW) | 11T waveform type | Jitter[*3] (%) |
|---|---|---|---|---|---|---|---|---|
| Comp.[*2] Ex. 1 | ① | 1.4T | 1.4T | 0.68T | 7.0 (2-times velocity) | >15 Power insufficient | — | — |
| Comp. Ex. 2 | ② | 2.0T | 1.5T | 0.6T | 14.0 (4-times velocity) | 12.0 | FIG. 5(a) | >15 |
| Comp. Ex. 3 | ② | 2.0T | 2.0T | 0.6T | 14.0 (4-times velocity) | 13.0 | FIG. 5(a) | 10.4 |
| Comp.[*2] Ex. 4 | ③ | 1.4T | 1.4T | 0.68T | 10.5 (3-times velocity) | >15 Power insufficient | — | — |
| Comp.[*2] Ex. 5 | ③ | 1.4T | 1.4T | 0.68T | 7.0 (2-times velocity) | 14.2 | FIG. 5(b) | 7.2 |

[*2]Write compensation was adapted.
[*3]Measured at EQ (gain of equalizer) = 3.2 dB.

EXAMPLE 10

On the disk prepared in Example 7, recording was carried out by changing the recording linear velocity from 1-time velocity (3.5 m/s) to 3-times velocity (10.5 m/s).

At 1-time velocity, α (3, 1)=1.6T, α (4, 1) to α (14, 1)=1.7T and α (2, 1) to α (14, 12)=0.65T, the recording power was 8.4 mW, the modulation was 60%, and the jitter was good at 7.6%.

At 2-times velocity, α (3, 1)=1.4T, α (4, 1)=1.55T, α (5, 1) to α (14, 1)=1.4T and α (2, 1) to α (14, 12)=0.68T, the recording power was 14.6 mW, the modulation was 66%, and the jitter was 7.0%.

Recording at 3-times velocity was as described above in Example 7, and the recording power was 15.0 mW, the modulation was 69% and the jitter was 7.4%. In each case of from 1-time velocity to 3-times velocity, the increase of the modulation when the recording velocity was changed to X-times velocity to (X+1)-times velocity, was less than 10%, the wobble C/N was 35 dB even at 3-times velocity, and AR was also good at 19%.

EXAMPLE 11

In Example 10, 1-time velocity recording was carried out for α (3, 1) to α (14, 1)=1.2T, and α (4, 2) to α (14, 12)=0.62T, and 2-times velocity recording was carried out for α (3, 1) to α (14, 1)=1.3T, and α (4, 2) to α (14, 12)=0.68T, whereby good recording similar to one in Example 10 was possible.

EXAMPLE 12

In Example 2, the strategy was changed to α (3, 1) to α (14, 1)=1.7T, and α (4, 2) to α (14, 12)=0.67T, and the recording velocity was changed to 10.5 m/s (3-times velocity), whereby the recording power was 12.4 mW, and the jitter was 9.4%. In this Example, write compensation was adapted. The waveform of 11T was FIG. 5(b) type.

EXAMPLE 13

In Example 3, the semiconductor laser in the evaluation machine ("DDU-1000", manufactured by PULSTEC INDUSTRIAL CO., LTD.) was changed to one having a wavelength of 662 nm and NA=0.60, and recording was carried out for α (4, 2) to α (14, 12)=0.9T at a recording velocity of 17.5 m/s (5-times velocity), and then evaluation was carried out.

As a result, the recording power was 18.6 mW, but by the change of the semiconductor laser, the upper limit of the recording power of this evaluation machine became 24.0 mW, whereby adequate recording was possible. Further, the modulation was 70%, and the jitter was 10%.

TABLE 2

| Example | Medium | Recording velocity (m/s) | α (3, 1) | α (4, 1) to α (14, 1) | α (4, 2) to α (14, 12) | Recording power (mW) | Modulation (%) | Jitter[*3] (%) |
|---|---|---|---|---|---|---|---|---|
| Ex. 10 | ③ | 3.5 (1-time velocity) | 1.6T | 1.7T | 0.65T | 8.4 | 60 | 7.6 |
| | | 7.0[*2] (2-times velocity) | 1.4T | 1.4T[*1] | 0.68T | 14.6 | 66 | 7.0 |
| | | 10.5 (3-times velocity) | 2.1T | 2.0T | 0.80T | 15.0 | 69 | 7.4 |

TABLE 2-continued

| Example | Medium | Recording velocity (m/s) | α (3, 1) | α (4, 1) to α (14, 1) | α (4, 2) to α (14, 12) | Recording power (mW) | Modulation (%) | Jitter*3 (%) |
|---|---|---|---|---|---|---|---|---|
| Ex. 11 | ③ | 3.5 (1-time velocity) | 1.2T | 1.2T | 0.62T | 8.8 | 60 | 7.8 |
| | | 7.0*2 (2-times velocity) | 1.3T | 1.3T | 0.68T | 15.0 | 66 | 7.2 |

*1Provided that α (4, 1) was 1.5T
*2Write compensation was adapted.
*3Measured at EQ (gain of equalizer) = 3.2 dB.

EXAMPLE 14

On the disk of Example 2, recording was carried out under such conditions that the laser power settings were $P_r$=0.7 mW, and $P_b$=0.7 mW ($P_r/P_b$=1.0) for 1-time velocity to 2-times velocity recording, $P_b$=0.5 mW ($P_r/P_b$=1.4) for 3-times velocity recording, or $P_b$=0.2 mW ($P_r/P_b$=3.5) for 4-times velocity recording.

Usually, deterioration of jitter caused by thermal interference is likely to be observed at the shortest mark length recorded portion in random recording with a high recording power like 3-times velocity recording or 4-times velocity recording. However, by adjusting the value of $P_r/P_b$, deterioration of jitter was not observed even when the recording power was increased to 15 mW, and thus, the recording power margin of jitter was broadened and good.

COMPARATIVE EXAMPLE 6

In Example 2, the solvent for the colorant solution, the temperature at the time of coating, the humidity and the coating rotational condition were changed, so that the colorant layer thickness (particularly the layer thickness at the land portion) was made slightly thicker to obtain a disk, whereby the increase of the modulation due to the recording linear velocity was large.

Recording was carried out by using the same conventional pulse strategy as in Comparative Example 4, whereby when the modulation in 1-time velocity recording was 58%, the wobble C/N at the recorded portion was −40 dB, while when the modulation in 2-times velocity recording was 70%, the noise increased by 8 dB, and C/N became −32 dB. Also, AR was 13% at 2-times velocity and did not meet the specification.

According to the present invention, with an optical recording medium containing an organic colorant in the recording layer and being capable of recording/readout at a wavelength of from 400 nm to 700 nm, high linear velocity recording applicable to computers will be possible, an adverse effect to e.g. the groove signals can be reduced, and recording to supplement the deficiency in the recording sensitivity of the recording layer becomes possible.

What is claimed is:

1. An optical recording method for an optical recording medium having a recording layer containing an organic colorant on a transparent substrate, which comprises applying a recording laser beam divided into n−2 (wherein n is an integer of at least 2) pulses (or into 1 pulse when n is 2), to the optical recording medium, to form a mark having a recording data of nT (wherein T is the reference clock period), wherein the length of the forefront pulse is at least 1.7T and at most 2.4T, and the lengths of the second and subsequent pulses (multi-pulses) are at least 0.7T and less than 1.0T.

2. The optical recording method according to claim 1, wherein the length of the forefront pulse is at least 1.9T and at most 2.4T.

3. The optical recording method according to claim 1, wherein the recording linear velocity is at least 9.0 m/s.

4. The optical recording method according to claim 1, wherein n is an integer of at least 3.

5. The optical recording method according to claim 1, wherein the ratio $P_r/P_b$, i.e. the ratio of the readout power Pr to the bias power $P_b$, is increased as the recording linear velocity increases.

6. The optical recording method according to claim 1, wherein recording is carried out on an optical recording medium whereby the difference between the modulated amplitude in recording at a recording linear velocity of X-times velocity and the modulated amplitude in recording at a recording linear velocity of (X+1)-times velocity, is at most 10%.

7. An optical recording medium on which recording can be made by the optical recording method as defined in claim 1.

8. An optical recording medium having recording made by the optical recording method as defined in claim 1.

* * * * *